United States Patent
Austin

(10) Patent No.: US 6,557,819 B2
(45) Date of Patent: May 6, 2003

(54) ROLL SEAL CONTROL VALVE

(76) Inventor: Cary M. Austin, 10221 CR 6900, Lubbock, TX (US) 79407

( * ) Notice: Subject to any disclaimer, the term of this patent is extended or adjusted under 35 U.S.C. 154(b) by 0 days.

(21) Appl. No.: 09/872,391

(22) Filed: Jun. 1, 2001

(65) Prior Publication Data

US 2001/0032948 A1 Oct. 25, 2001

Related U.S. Application Data

(63) Continuation-in-part of application No. 09/542,312, filed on Apr. 4, 2000, which is a continuation-in-part of application No. 09/243,730, filed on Feb. 1, 1999, now Pat. No. 6,109,296, which is a continuation-in-part of application No. 08/886,905, filed on Jul. 2, 1997, now Pat. No. 5,988,984, which is a continuation-in-part of application No. 08/427,448, filed on Apr. 24, 1995, now abandoned, which is a continuation-in-part of application No. 08/103,340, filed on Aug. 6, 1993, now abandoned.

(51) Int. Cl.$^7$ .............................................. F16K 31/12
(52) U.S. Cl. ........................ 251/28; 251/61; 251/117; 137/601.13; 137/601.2
(58) Field of Search .......................... 137/513.5, 513.3, 137/492.5, 601.2, 601.3, 601.13, 513.7, 488; 251/61.1, 61.2, 61.4, 28

(56) References Cited

U.S. PATENT DOCUMENTS

| | | | | |
|---|---|---|---|---|
| 2,111,991 A | * | 3/1938 | Richard | 137/513.5 |
| 3,782,858 A | * | 1/1974 | Deters | 137/505.41 |
| 3,814,543 A | * | 6/1974 | Gritz | 137/505.44 |
| 4,607,615 A | * | 8/1986 | Boals | 137/560 |
| 4,722,481 A | * | 2/1988 | Lemkin | 137/513.5 |
| 5,060,630 A | * | 10/1991 | Boals | 137/513.5 |

* cited by examiner

*Primary Examiner*—John Bastianelli
(74) *Attorney, Agent, or Firm*—Wendell Coffee

(57) ABSTRACT

A water system uses a pressure reservoir of an extremely small size. A valve device is placed between a water pump and the pressure reservoir. The valve device has a constant outlet pressure to limit the flow from the pump at high pressures. The pump is turned on and off by a pressure on/off switch. The valve device maintains the pressure to the reservoir at or below the off switch pressure except for a trickle flow. The trickle flow fills the reservoir when there is little or no water usage from the reservoir. The trickle flow is achieved by preventing the surfaces to seal by a projection or notch the valve surfaces of the valve device. Each time the valve opens any debris is washed from the valve surfaces thereby keeping them free of debris.

11 Claims, 4 Drawing Sheets

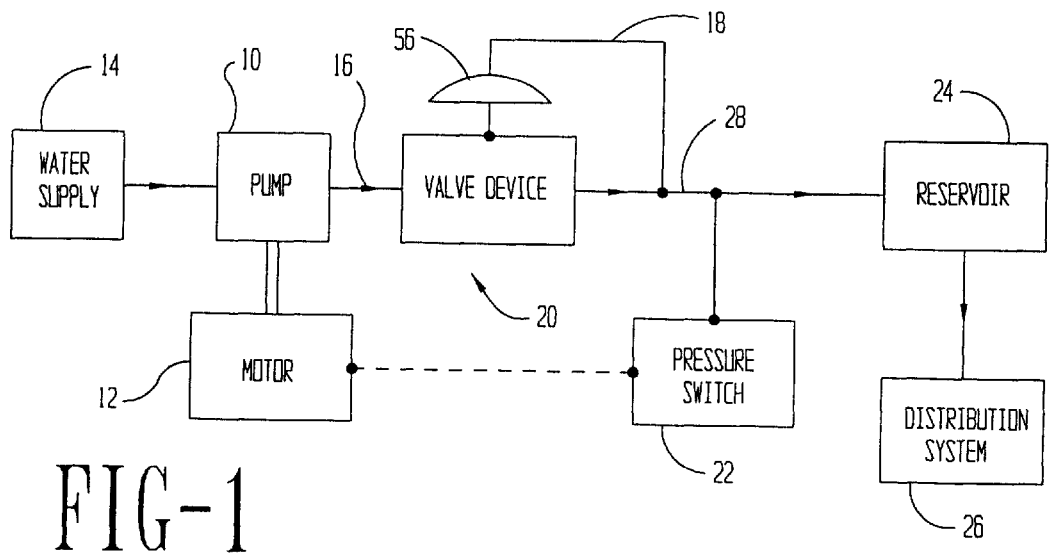
FIG-1
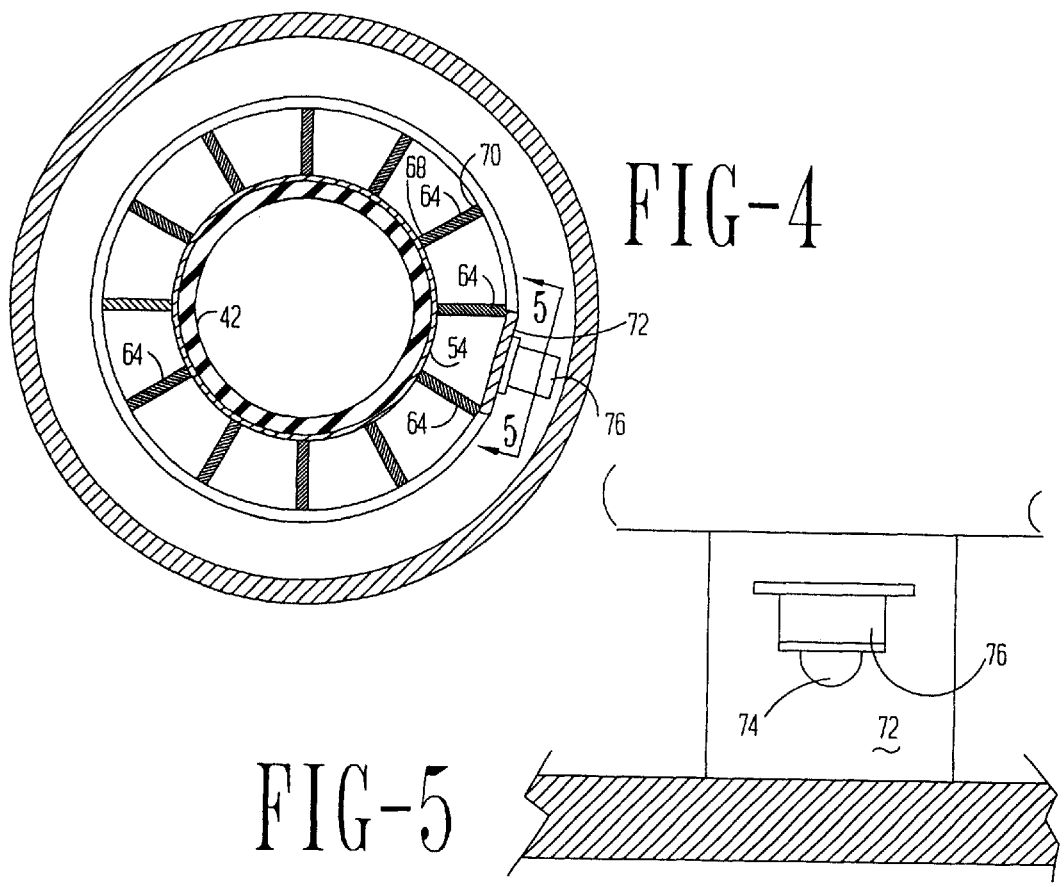
FIG-4
FIG-5

ROLL SEAL CONTROL VALVE

CROSS REFERENCE TO RELATED APPLICATION:

This is a continuation in part of my prior application on this subject matter filed Apr. 4, 2000, Ser. No. 09/542,312 now in Issue, Batch F21, which was a continuation in part of my prior application on this subject mater filed Feb. 1, 1999, Ser. No. 09/243,730 now U.S. Pat. No. 6,109,296 which was a continuation in part of my application filed Jul. 2, 1997, Ser. No. 08/886,905 now U.S. Pat. No. 5,988,984 which was a continuation in part of my application filed Apr. 24, 1995, Ser. No. 08/427,448 (now abandoned) which was a continuation in part of my application filed Aug. 6, 1993, Ser. No. 08/103,340 (now abandoned). Specific reference is made to the above documents.

BACKGROUND OF THE INVENTION:

(1) Field of the Invention

This invention relates to liquid pumps and liquid systems and more particularly to a valve and system to prevent a motor driving a liquid pump from cycling, that is quickly and repeatedly turning off and on. Owners and operators of water systems have ordinary skill in the art of this invention.

(2) Description of the Related Art

Many water pumps supply water to a system having irregular, intermediate use. Often these water pumps supply water into a small reservoir such as a pressure tank. Water systems normally have a range of operating pressures. For example, the range of water of pressures is set between 40 and 60 p.s.i. This pressure range is normally achieved with a pressure switch which cuts off the motor to the pump at 60 p.s.i. and then turns it on at a pressure of 40 p.s.i. If the use is such that the small pressure tank is quickly drained, the motor is switched on, the pump fills the pressure tank quickly, the pump switches off, and then as the tank is quickly drained, the pump switches on again. so Most of the wear and damage to the motors and the pumps is caused by the numerous repeated starts and stops of the system.

Such a system as described is common on residential water supplies having a separate water supply for every residence, as often occurs in rural areas. Also the problem arises in systems that have irregular irrigation, for example, golf courses where different flow rates are required. Some systems with cycling problems have multiple pump stations which are activated according to the different supplies of water needed. Also the system with cycling problems exists with tall buildings where because of the building height it is necessary to have controls for different levels of the building, and different flow rates.

The problem also exists in liquid systems other than water. For example, the ordinary gasoline fuel dispenser at an auto service station has an electric motor driven pump which delivers fuel to a small pressure tank, then to a metering device, and then to the manually controlled nozzle. When the auto tank is nearly full the customer will often reduce the flow to a dribble to "top off" the tank. This will cause the motor to cycle on and off.

Constant outlet pressure valves are well known to the art. Such valves are designed to reduce the flow if the outlet pressure is above the optimum range and to completely stop the flow when it exceeds the preset pressure.

Before this invention, attempted solutions to alleviate this problem included installing a constant outlet pressure valve with a small bypass around the constant outlet pressure valve. The valve is installed downstream of the pump and upstream of the reservoir and pressure switch. For example, if the normal flow is fifteen gallons per minute, the bypass provides a flow of one gallon per minute. Therefore, when there is a small volume of flow, the liquid will continue to trickle through the bypass and slowly refill the reservoir. When the reservoir is sufficiently full, the pressure switch will shut the motor off. The reservoir will supply the need until the water flow again reaches levels so that the pressure switch closes, starting the pump motor to fill the reservoir. However, these bypasses exhibited certain problems, one of which being the noise caused by the pressure of the liquid flowing through a small opening. Also, the small opening is susceptible to being clogged with debris.

My previous ancestor or precursor applications, referenced above, solved this problem by cutting a notch in one of the seating surfaces on either the valve seat or the valve device. Therefore, when the valve is closed, the trickle flow is through this notch. Experience has shown that this will not be a noisy flow, nor will it clog. Each time the valve opens debris which might collect in the restricted flow device (the notch) is flushed out by the opening of the valve and the flow of liquid across the notched surface.

SUMMARY OF THE INVENTION

(1) Progressive Contribution to the Art

This application claims another means for and method of producing a trickle flow. Specifically instead of cutting a notch in one of the sealing surfaces, a projection is created on one of the surfaces. One surface must be elastomeric, thus causing a trickle flow at the deformation caused by the projection.

(2) Objects of this Invention

An object of this invention is to provide a valve device with controlled outlet pressure.

Another object is to prevent the cycling of motors on liquid pumps feeding small reservoirs.

A further object is to prevent the cycling with a non-clogging trickle flow through a constant outlet pressure valve.

Further objects are to achieve the above with devices that are sturdy, compact, durable, lightweight, simple, safe, efficient, versatile, ecologically compatible, energy conserving, and reliable, yet inexpensive and easy to manufacture, install, operate, and maintain.

Other objects are to achieve the above with a method that is versatile, ecologically compatible, energy conserving, efficient, inexpensive, and does not require highly skilled people to install, operate, and maintain.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 1 is a schematic representation of a liquid system using a valve device according to this invention.

FIG. 4 is section view of the valve of FIG. 2 taken substantially on line 4—4 of FIG. 2.

FIG. 5 is a sectional view of the valve of FIG. 4 taken substantially on line 5—5 of FIG. 4.

Figure 2:
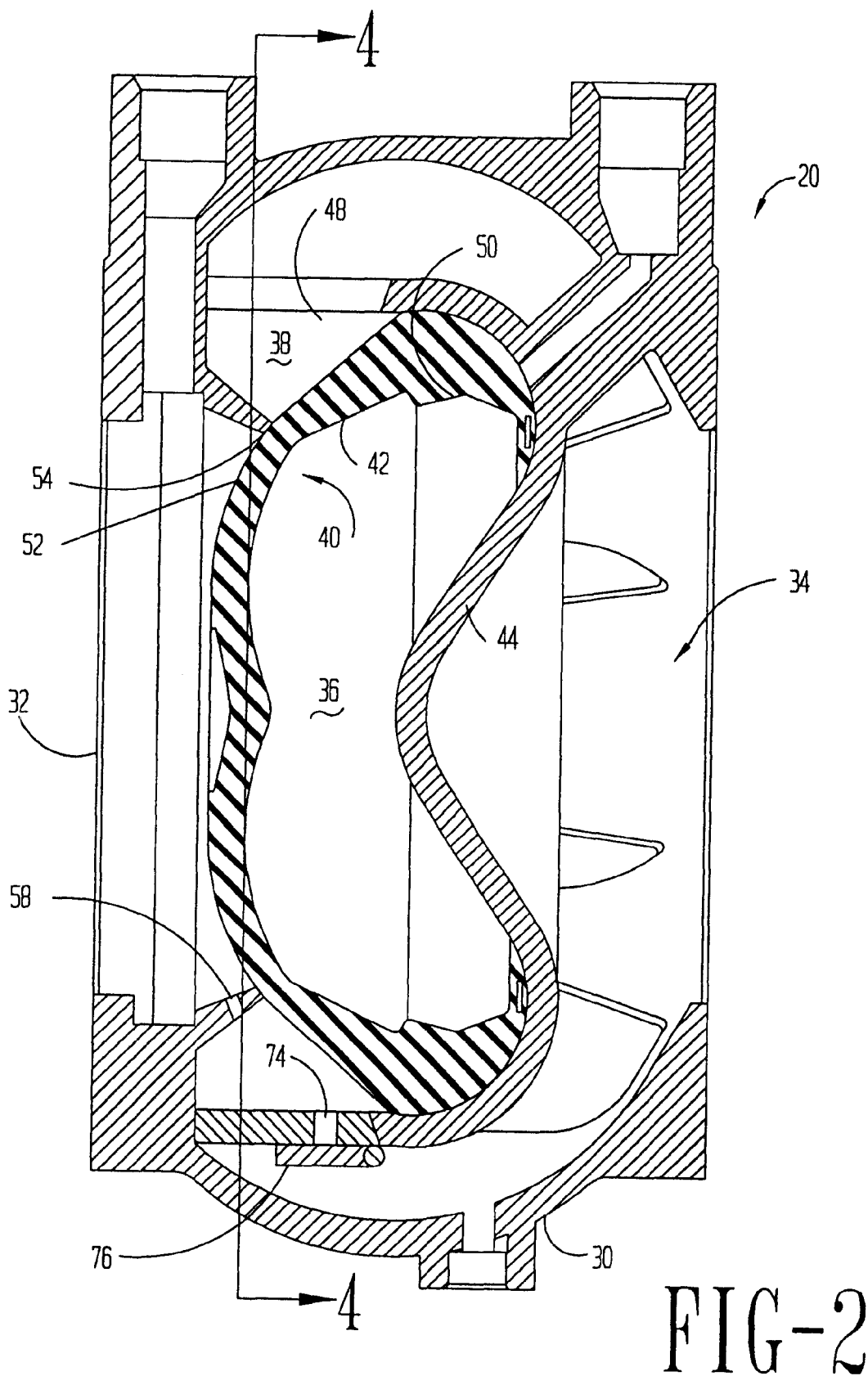
FIG. 2 is a sectional view of a roll seal valve modified according to this invention, in the closed position.

Catalogue of Elements:

As an aid to correlating the terms of the claims to the exemplary drawing(s), the following catalog of elements and steps is provided:

| 10 | pump |
| 12 | motor |
| 14 | water supply |
| 16 | pump pipe |
| 18 | control pressure line |
| 20 | valve device |
| 22 | pressure switch |
| 24 | reservoir |
| 26 | distribution |
| 28 | reservoir pipe |
| 30 | housing |
| 32 | inlet |
| 34 | outlet |
| 36 | passage way |
| 38 | valve seat |
| 40 | valve member |
| 42 | diaphragm |
| 44 | cover |
| 46 | control chamber |
| 48 | slotted grillwork |
| 50 | peripheral section |
| 52 | valve sealing surface |
| 54 | seat sealing surface |
| 56 | pilot valve |
| 58 | notch |
| 60 | notch |
| 62 | project vane |
| 64 | std vane |
| 66 | valve projection |
| 67 | seat projection |
| 68 | diaphragm side |
| 72 | plate |
| 74 | opening |
| 76 | door flap |

DESCRIPTION OF THE PREFERRED EMBODIMENT:

An embodiment of the valve device according to this invention is designed to work with motor driven pumps which are non-positive displacement. The valves would also work with a positive displacement pump if the pump were powered by a motor which would reduce its speed via increased back pressure on the pump. Usually the valves are used on pumps having constant velocity and the flow rate of the pumps decrease with increased pressure. The most common pumps of this type are centrifugal pumps.

The valve devices of this invention will always include a valve seat and a valve element that moves relative to the valve seat. Often the valve seat and the valve each have a plane surface, and the surfaces are always parallel in their relationship. In some cases the valve surfaces are conical. Some valves have a toothed surface to cause a zigzag spray pattern from the partially opened valve instead of a flat spray pattern. Sometimes a butterfly or gate valve in combination with a servo motor is used to open and close the valve control.

The valve is basically a constant outlet pressure valve. Upon increase of the downstream pressure, the valve opening is reduced to reduce the flow to maintain downstream pressure. Upon reduced pressure the valve opening increases. Normally the flow will be adjusted by having a spring bias the valve element away from the valve seat. Increased down stream pressure will oppose the spring and will force the valve element toward the valve seat. The programming of the valve to close with additional downstream pressure is within the skill of persons skilled in such art.

Referring to FIG. 1 there may be seen a schematic representation of a water system according to this invention.

Pump 10 connected to motor 12 pumps liquid from a liquid supply, usually a water supply 14, into pump pipe 16. With increased pressure in the pump pipe 16, the pump 10 pumps less water through the pump pipe 16. Centrifugal pumps have this as an inherent characteristic as do vane pumps with axial flow. Constant displacement pumps would not have this characteristic; however if the power supply from motor 12 were such that increased load by the pump would reduce the motor speed this would have the required result. The required result, as stated before, is the increased pressure upon pump pipe 16 reducing the volume of flow from the pump 10.

The motor 12 could be of various types. The water supply could be of any type. It might be an underground well. It might be a low pressure reservoir with the pump pumping from the reservoir into a distribution system.

The outlet of the pipe 16 is connected to valve device 20 that will be described in detail later. The outlet from the valve device is connected to pressure switch 22, reservoir 24, and distribution system 26 by reservoir pipe 28. According to this invention, the reservoir is a pressure reservoir. In an elevated tank the water pressure of the reservoir pipe 28 will vary with the height of water in the reservoir. More commonly, according to the use of this invention, the reservoir would be a pressure tank having a compressed air cap that under normal practice would be separated from the water by a flexible bladder. Increased water in the tank compresses the air and increases the pressure on the pipe 28. Such tanks are well known and commercially upon the market.

The distribution system might be any distribution system such as a single rural residence; or the complete system for a golf course with a club house including showers, kitchens, etc.; or a small village; or subdivision of a city; or the upper floors of a tall building; or for other liquids such as gasoline pumps.

The pressure switch 22 for an electric motor 12 would be a simple switch which at a specified low pressure provides electrical power to the motor 12 and at a preset high pressure cuts off the electric power to the motor 12. Such switches are well known and commercially available on the market. If the motor 12 were an internal combustion engine, the pressure switch 22 might remain the same, but the control for the motor would be required to have an automatic starting control at the low pressure output from the pressure switch 22 and a shut-off control responsive to the high pressure output from the pressure switch 22. Such motor controls are also well known and commercially available.

Referring to FIG. 1 there may be seen a schematic representing a typical basis for this invention. As may be seen the pump 10 driven by a motor 12 pumps water from a water supply 14 to a reservoir 24 through a valve device 20. As is customary the motor is turned off when a pressure switch senses a high pressure within the reservoir 24 indicating that the reservoir has designed supply of water.

After the motor is turned off the water from the reservoir will be used by the distribution system 26. When the fluid in the reservoir lowers to a desired level the pressure switch 22 will signal motor 12 to start pumping more water from the water supply 14 to the reservoir 24.

Quite often the reservoir will be a pressurized tank. The maximum pressure will be when the water has compressed the air cap in the tank for a sufficient amount of water. When the water level is depleted to the state the air pressure in the reservoir 24 indicates a water requirement the pressure switch will again start the motor 12. It will also be understood that if the reservoir was an open tank the elevation of the water in the tank would supply the pressures for controlling the pressure switch.

Certain elements have not been shown. One such element would normally be a check valve between the pump and the reservoir to prevent a back flow from the reservoir back to the pump.

The valve device 20 is to prevent cycling of the motor. When reasonable pressure shows that the reservoir is getting full, control pressure line 18 from the pipe 28 to the pressure valve device 20 will reduce the amount of water flowing through the valve device so that it does not quickly bring the reservoir up to full pressure but delays it. The valve device always provides a trickle of water sufficient to prevent damage to the pump and to the motor.

In many installations the motor and pump are within a well, and the pump is directly connected to the motor in the well. The trickle flow will be sufficient to keep the motor cool. The description as set out is the same of that set out in my prior U.S. Pat. No. 5,988,984.

According to this improvement the valve device might be a roll seal valve manufactured by the Cla-Val Valve Company, Inc. P.O. Box 1325, Newport Beach, Calif. 92659-0325. The roll seal valve is a pressure control valve which can be operated to close the flow of water when the downstream pressure reaches a preset level in pipe 28. As manufactured the valve will completely close, so that not even a trickle of water passes to the reservoir. To cause the valve to permit a trickle of water as outlined above a notch may be cut across the sealing surfaces between the valve sealing surface and the seat sealing surface.

Referring more particular to FIG. 2 there may be seen a sectional view of roll seal valve 20 as modified for this purpose. The roll seal valve housing 30 has an inlet 32, an outlet 34, and a passage way 36 for the water to flow from the inlet 32 to the outlet 34. FIG. 2 shows the valve fully closed.

Figure 3:
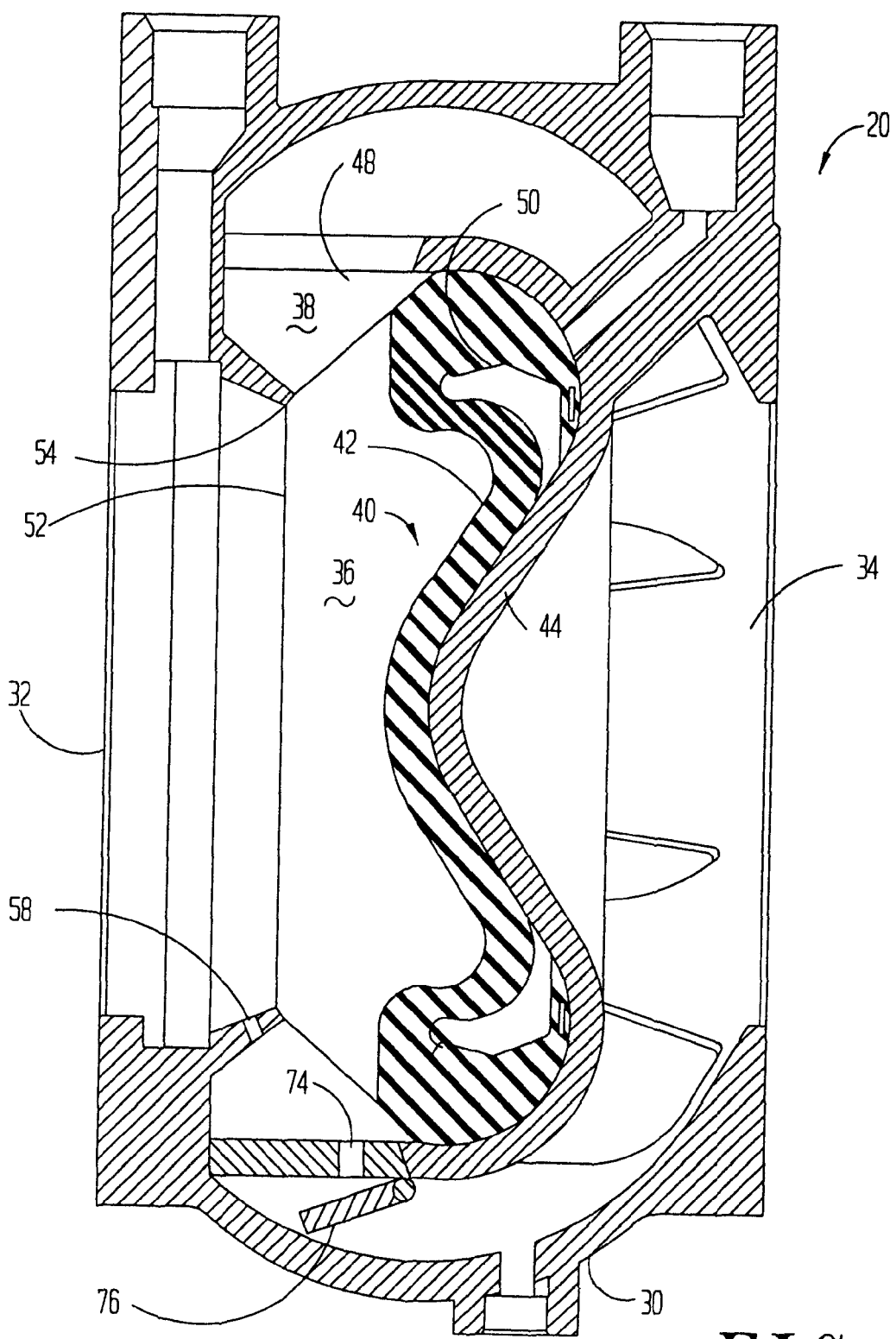
FIG. 3 is a sectional view of the modified valve of FIG. 2, in the open position.

FIG. 3 shows the valve in an open position and therefore it may be seen that the water may flow from the inlet to the outlet. The passage way 36 is shown closed in FIG. 2 but is open in FIG. 3. The passage way is surrounded by valve seat 38. Valve member 40 includes a diaphragm 42 within the housing 30. The diaphragm may be displaced toward and away from the valve seat 38 to control the flow through the valve. The housing includes a rigid cover 44. The cover 44 is between the outlet 34 and the passage way 36.

Control chamber 36 is formed between cover 44 and the diaphragm 42. The cover is attached to the housing by slotted grillwork 48. The diaphragm includes an outer peripheral section 50 secured to the cover 44 and aligned with the valve seat 38. The valve closing area has valve sealing surface 52 which is shown in FIG. 2 to be in contact with seat sealing surface 54. The valve closure section of the diaphragm is displaced with respect to the valve seat for controlling the flow through the valve seat. The valve sealing surface is contacting the seat sealing surface when the valve member is fully closed.

The slotted grillwork includes vanes 64 which connect the housing 30 to the cover 44 and to the valve seat 38. The vanes are aligned with the flow of water from the inlet 32 to the outlet 34. As the valve opens the diaphragm 42 rolls up along the vanes 46. As the valve closes the diaphragm rolls down along the vanes 64.

The description to this point of the roll seal valve 20 is a product which is presently on the market.

A liquid passage way across the valve sealing surface 52 and the seat sealing surface 54 provides the trickle flow. Notch 58 is one example of the liquid passage way.

Figure 6:
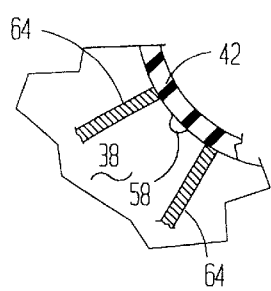
FIG. 6 is a sectional view of the valve of FIG. 2 taken substantially an line 6—6 of FIG. 2.
Figure 7:
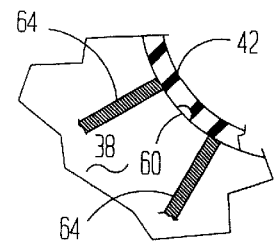
FIG. 7 is a sectional view similar to FIG. 6 showing a modification.

It will be understood that the diaphragm is a single unit of elastomeric material. As shown in FIG. 6 the notch 58 may be cut across the seat sealing surface 54. As shown in FIG. 7 the notch 60 may be cut across the valve sealing surface 52.

Figure 8:
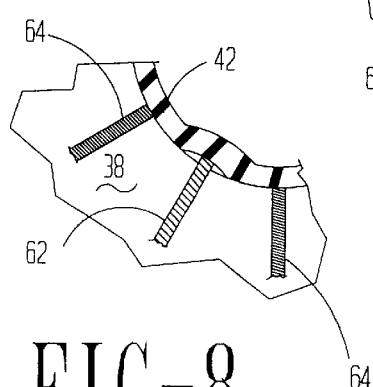
FIG. 8 is a sectional view similar to FIG. 6 showing another modification.

Another variation is seen in FIG. 8 where no notches are present but one vane 62 projects inward further than any of the other uniform vanes 64 as produced by the Roll Valve Co.

The valve member 42, being of elastomeric material, would deform when contacted by the projected vane 62. The deformation of the valve member 42 would prevent the sealing surfaces 52 and 54 from meeting. The deformation would provide for the trickle flow on both sides of the vane 62.

Figure 9:
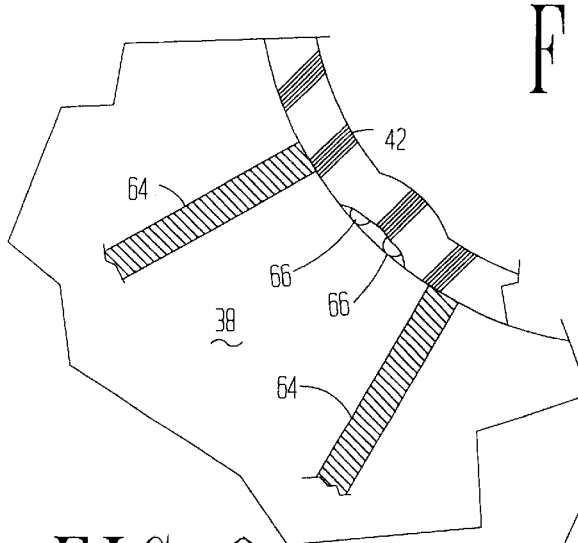
FIG. 9 is a sectional view similar to FIG. 6 showing another modification.

Also, as seen in FIG. 9, the trickle flow could be provided by a projection, or multiple projections, 66 on the valve sealing surface 52.

The projection 66 on the sealing surface 52 would deform the elastomeric valve member 42 thus providing the trickle flow. The projections 66 could be molded into the valve member 42 at the sealing surface 52.

Figure 10:
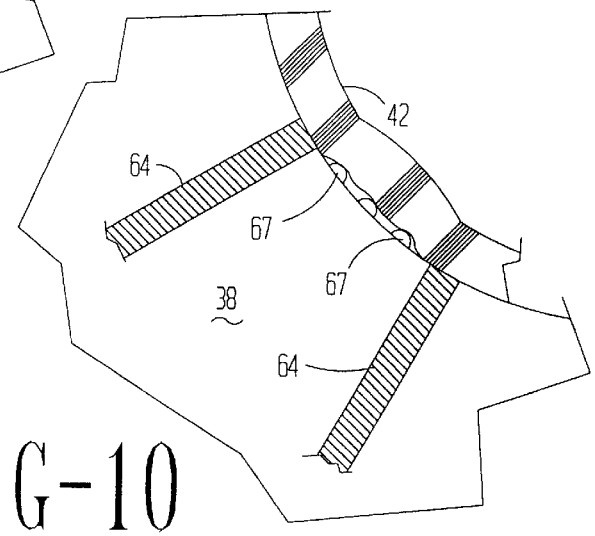
FIG. 10 is a sectional view similar to FIG. 6 showing another modification.

Futher, as seen in FIG. 10, the trickle flow could be provided by a projection, or multiple projections, 67 on the sealing surface 54. The projection 67 on the sealing surface 54 would deform the elastomeric valve member 42 thus providing the trickle flow. The projections 67 could be welded onto or molded into the seat 38 at the sealing surface 54.

Referring to FIG. 4 there may be seen a notch 52 or 54 across the seat sealing surface. This notch is between adjacent vanes 64. The vanes each have a diaphragm edge 68 and a downstream edge 70.

Between the cover 44 and the inlet 32 below the cover 44 the vanes do not extend to the housing 30. The down stream edges 70 of the vanes are parallel to the axis (not illustrated) of the valve 20.

On the two vanes which straddle the notch 54 a plate 72 is attached over the vanes at the downstream edge 70. The plate 72 prevents any liquid from passing through the valve 54 from the inlet side 32 to the outlet 34 except for an opening 74 in the plate 72. This opening 74 allows a trickle flow which flows through the notch 54 to also pass through the opening 74 and into the downstream side.

In the situation where the downstream pressure at pipe 28 was higher than the upstream pressure at 16, a check valve in the form of a flap 76 would prevent this back flow.

Therefore, by sealing off the outlet from the vanes it is possible to prevent back flow using a simple check valve within the control valve itself.

Those with skill in the ordinary art will understand that although the plate 72 is shown for only one space between vanes, if a liquid passage way extended for a greater length than the distance between adjacent vanes two of the areas could be provided with a sealing plate or with a hole through the plate with the check valve closing the hole to prevent the reverse flow.

The embodiment shown and described above is only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to point out the advantages and the progressive contribution to the liquid pump arts and to enable one skilled in the art to make and use the invention. The limits of the invention and the bounds of the patent protection are measured by and defined in the following claims.

I claim as my invention:

1. In a control valve, including:
   a) a housing having an inlet, an outlet, and a main passageway for the flow of liquid from the inlet to the outlet, the main passageway surrounded by a valve seat having a seat sealing surface;
   b) an elastomeric valve member having a valve sealing surface within the housing, the valve member displaceable towards or away from said valve seat to regulate the flow therethrough;
   c) the valve sealing surface contacting the seat sealing surface when the valve member is fully closed;
   d) a projection at one of the sealing surfaces so that
   e) the elastomeric valve member is deformed by the projection thereby forming a liquid passageway between and sealing surfaces.

2. The valve as defined in claim 1 wherein the projection is on the valve seating surface.

3. The valve as defined in claim 1 wherein the projection is on the seat sealing surface.

4. The valve as defined in claim 1 wherein
   f) a liquid output of a pump is connected to the inlet of the housing;
   g) a motor is driving connected to the pump,
   h) a liquid distribution system is connected to the outlet of the housing, and
   i) a pilot valve is connected to the outlet of the housing.

5. The valve as defined in claim 4 wherein:
   said liquid passageway is large enough to permit a flowing of sufficient liquid to prevent damage to the pump or motor by their continued operation.

6. The valve as defined in claim 1 wherein:
   f) the housing further includes a rigid cover between the outlet and main passageway, a control chamber is formed between the cover and the valve member and the cover attached to the housing by slotted grillwork surrounding the valve seat;
   g) the valve member includes an outer flexible peripheral section secured to the cover and in alignment with said valve seat, a valve-closure section having the valve sealing surface surrounding a center area, the valve-closure section displaceable with respect to the valve seat for controlling the flow therethrough, and
   h) a pilot valve fluidly connected to the control chamber.

7. The valve as defined in claim 6 wherein said liquid passageway is formed by a projection from the slotted grillwork on the valve seat sealing surface.

8. In a control valve, including:
   a) a housing having an inlet, an outlet, and a main passageway for the flow of liquid from the inlet to the outlet, the main passageway surrounded by a valve seat having a seat sealing surface;
   b) an elastomeric valve member having a valve sealing surface within the housing, the valve member displaceable towards or away from said valve seat to regulate the flow therethrough;
   c) the valve sealing surface contacting the seat sealing surface when the valve member is fully closed;
   d) a projection at one of the sealing surfaces so that
   e) the elastomeric valve member is deformed by the projection thereby forming a liquid passageway between and sealing surfaces,
   f) the housing further includes a rigid cover between the outlet and main passageway, a control chamber is formed between the cover and the valve member and the cover attached to the housing by slotted grillwork surrounding the valve seat
   g) the valve member includes an outer flexible peripheral section secured to the cover and in alignment with said valve seat, a valve-closure section having the valve sealing surface surrounding a center area, the valve-closure section displaceable with respect to the valve seat for controlling the flow therethrough,
   h) a pilot valve fluidly connected to the control chamber,
   i) the slotted grillwork includes vanes, each vane having a valve side and a downstream side and each vane extends from the valve seat to the housing thus forming a slot between adjacent vanes,
   j) said valve pressed against the valve side of the vanes when fully closed,
   k) said liquid passageway having a width less than the width of two slots,
   l) a closure at the vane downstream side of all slots having access to said liquid passageway,
   m) an opening in each closure, and
   n) a check valve over the opening.

9. The valve as defined in claim 8 wherein:
   o) between the cover and the inlet the vanes do not extend to the housing and
   p) the downstream edge of the vanes are parallel to the axis of the valve.

10. In a control valve, including:
    a) a housing having an inlet, an outlet, and a main passageway for the flow of liquid from the inlet to the outlet, the main passageway surrounded by a valve seat having a seat sealing surface;
    b) an elastomeric valve member having a valve sealing surface within the housing, the valve member displaceable towards or away from said valve seat to regulate the flow therethrough;
    c) the valve sealing surface contacting the seat sealing surface when the valve member is fully closed;
    an improvement comprising:
       d) a projection at one of the sealing surfaces so that e) the elastomeric valve member is deformed by the projection thereby forming a liquid passageway between and sealing surfaces,
f) the housing further includes a rigid cover between the outlet and main passageway, a control chamber is formed between the cover and the valve member and the cover attached to the housing by slotted grillwork Surrounding the valve seat;
g) the valve member includes an outer flexible peripheral section secured to the cover and in alignment with said valve seat, a valve-closure section having the valve sealing surface surrounding a center area, the valve-closure section displaceable with respect to the valve seat for controlling the flow therethrough, and
h) a pilot valve fluidly connected to the control chamber,
i) said liquid passageway is formed by a projection from the slotted grillwork on the valve seat sealing surface,
ii) the slotted grillwork includes vanes, each vane having a valve side and a downstream side and each vane extends from the valve seat to the housing thus forming a slot between adjacent vanes,
j) said valve pressed against the valve side of the vanes when fully closed,
k) said liquid passageway having a width less than the width of two slots, and
l) a closure at the vane downstream side of all slots having access to said liquid passageway,
m) an opening in each closure, and
n) a check valve over the opening.

11. The valve as defined in claim 10 herein:
o) between the cover and the inlet the vanes do not extend to the housing, and
p) the downstream edge of the vanes are parallel to the axis of the valve.

* * * * *